US009637178B1

(12) United States Patent
Diller et al.

(10) Patent No.: US 9,637,178 B1
(45) Date of Patent: May 2, 2017

(54) TUBULAR VEHICLE EXTERIOR ACCESSORY EXTRUSION

(71) Applicant: Curt Manufacturing, LLC, Eau Claire, WI (US)

(72) Inventors: Joel D. Diller, Eau Claire, WI (US); Robert G. Fehr, Colfax, WI (US); Wolfe C. Parzyck, Colfax, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 0 days.

(21) Appl. No.: 14/887,230

(22) Filed: Oct. 19, 2015

(51) Int. Cl.
*B60R 3/00* (2006.01)
*B62D 29/00* (2006.01)
*B60R 19/52* (2006.01)
*B60R 21/13* (2006.01)
*B62D 65/16* (2006.01)
*B21C 23/00* (2006.01)
*C22C 21/00* (2006.01)

(52) U.S. Cl.
CPC .......... *B62D 29/008* (2013.01); *B21C 23/002* (2013.01); *B60R 3/002* (2013.01); *B60R 19/52* (2013.01); *B60R 21/13* (2013.01); *B62D 65/16* (2013.01); *C22C 21/00* (2013.01)

(58) Field of Classification Search
CPC .... B60R 3/00; B60R 3/02; B60R 3/06; B60R 3/002; B60R 3/007; B62D 37/02; B62D 35/008
See application file for complete search history.

(56) References Cited

U.S. PATENT DOCUMENTS

| 4,469,360 | A | 9/1984 | Drury | |
|---|---|---|---|---|
| 8,342,550 | B2 | 1/2013 | Stickles et al. | |
| 8,528,925 | B2 | 9/2013 | McFarlane | |
| 8,668,124 | B2 | 3/2014 | Kennedy et al. | |
| 8,864,158 | B1 * | 10/2014 | Perkins | B60R 3/002 280/163 |
| 9,108,581 | B2 | 8/2015 | Perez | |
| 2005/0263975 | A1 * | 12/2005 | Mulder | B60R 3/002 280/163 |
| 2007/0296175 | A1 * | 12/2007 | Flajnik | B60R 3/002 280/169 |
| 2014/0291957 | A1 * | 10/2014 | Muhe-Sturm | A62C 27/00 280/163 |

* cited by examiner

Primary Examiner — Bryan Evans
(74) Attorney, Agent, or Firm — Shewchuk IP Services, LLC; Jeffrey D. Shewchuk

(57) ABSTRACT

A hollow tubular shape is extruded from aluminum and used as a basic building block for one or more different truck accessories, such as a side step, grill guard and headache rack. The outside of the hollow tubular shape provides flat surfaces and angled edges over most of its periphery, including a major wall and several side walls. An attachment wall opposite the major wall includes attachment slides that enable the extrusion to be attached in numerous configurations, including to attachment brackets. The interior of the extruded hollow tubular shape includes openings to receive end caps.

22 Claims, 8 Drawing Sheets

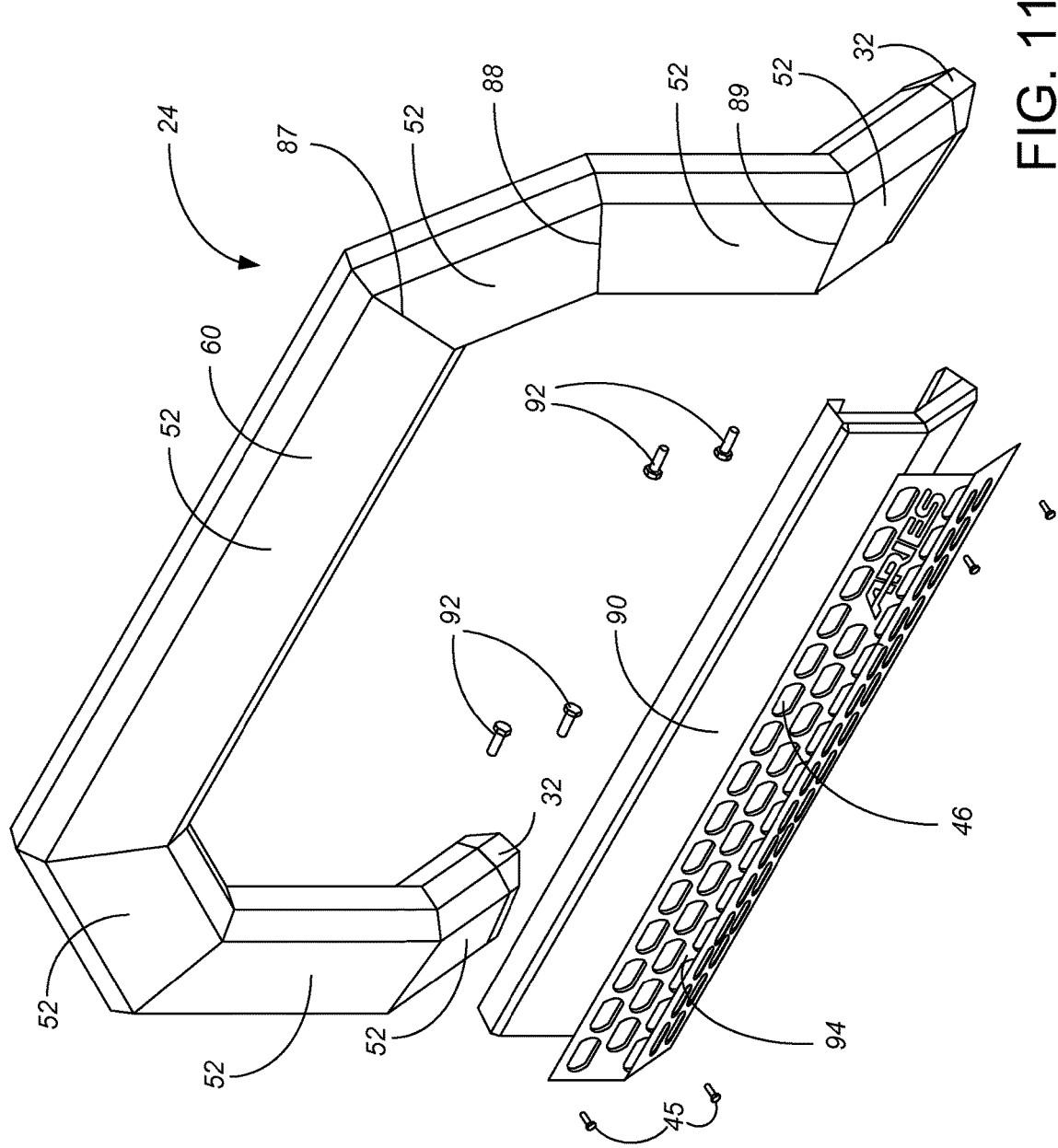

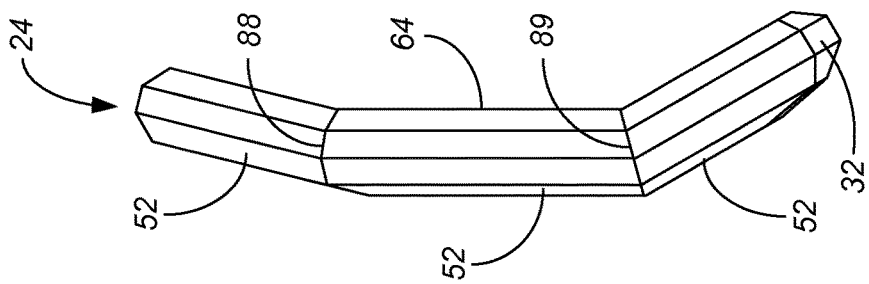
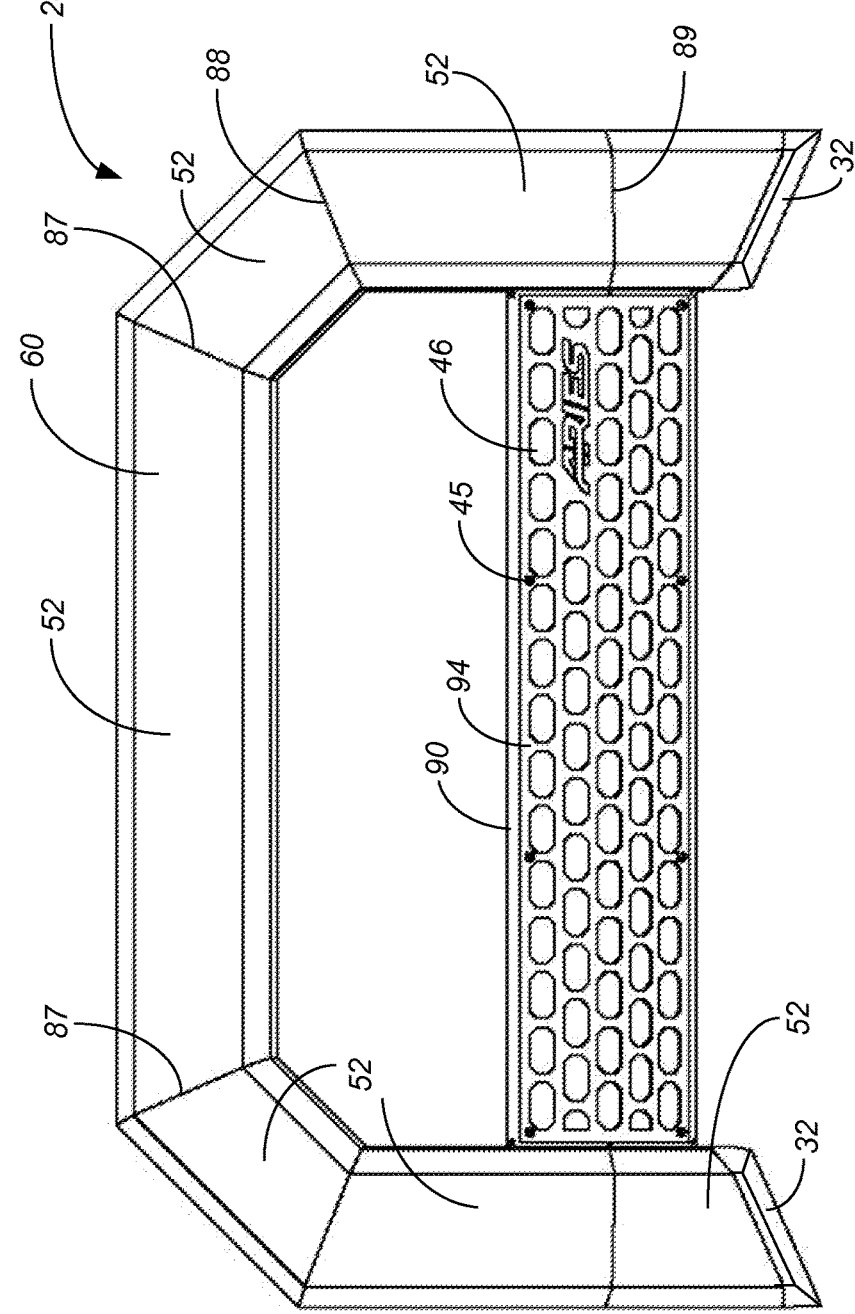

TUBULAR VEHICLE EXTERIOR ACCESSORY EXTRUSION

CROSS-REFERENCE TO RELATED APPLICATION(S)

None.

BACKGROUND OF THE INVENTION

Many different types of exterior accessory products are known for attachment to vehicles such as trucks, sport utility vehicles ("SUVs"), crossover utility vehicles ("CUVs"), four-wheel drive vehicles ("4×4s"), jeeps, police cars, all-terrain and other utility vehicles. Such exterior accessories can be provided as part of a trim package offered by the original equipment manufacturer, but more commonly are provided in the automotive and trucking aftermarket.

For instance, exterior accessories such as grill guards, brush guards, push bars and bull bars (collectively referred to as "grill guards") are attached on the front end of vehicles. See U.S. Pat. Nos. 4,469,360 and 9,108,581, for example, both incorporated by reference. Exterior accessories known as side steps, running boards and nerf bars are attached on the sides of vehicles running horizontally beneath the doors. See U.S. Pat. Nos. 8,342,550 and 8,528,925, for example, both incorporated by reference. Exterior accessories such as headache racks are attached behind the cab in vehicles. See U.S. Pat. No. 8,668,124, for example, incorporated by reference. These exterior accessories are commonly independently designed, often with an attachment bracket specially designed to fit the frame, bumper or bed of the particular vehicle with which the exterior accessory attachment bracket will be used. Many common designs of exterior accessory products are derived using tubular metal (such as steel or aluminum alloy) as the primary starting material, with the tubular metal being cut, bent and/or welded into the shape desired for the exterior accessory product. Standard tubular metal shapes include round, rectangular and oval, and such standard tubular metal shapes have been used for aftermarket exterior accessories. Attachment brackets are commonly formed from sheet or plate metal, welded or bolted to the tubular metal at appropriate locations.

Exterior accessory products are normally subjected to considerable amounts of dirt and grime, and are treated very roughly and withstand considerable impacts and loads, and exterior accessory products should readily withstand such conditions. The exterior accessory product and its attachment bracket must be robust and reliable, to last for carefree operation over the life of at least one vehicle despite being openly exposed to weather over its years or decades of use. As much as possible, the exterior accessory product should also have minimal cost and expense in manufacturing and assembly. When sold into the automotive or trucking aftermarket, the method of attachment to the vehicle should be simple, reliable and strong, using readily available tools. In keeping with these objectives, further improvements to exterior accessory products are possible.

BRIEF SUMMARY OF THE INVENTION

The present invention is a vehicle exterior accessory, such as a side step, bull bar or headache rack or combinations thereof, formed from a hollow tubular member which can be extruded aluminum. The hollow tubular member has a shape making it particularly applicable for this use. The shape of the hollow tubular member includes a major wall having a generally planar exposed major surface running longitudinally, and at least four further side walls providing planar exposed surfaces. Opposite the major wall, an attachment wall completes the hollow tubular profile. The attachment wall has a necked connection slide which is exposed and runs longitudinally, which can be used in connecting the vehicle exterior accessory to the vehicle using a bracket. In one aspect, the interior of the hollow tubular member is configured for attachment to end caps.

BRIEF DESCRIPTION OF THE DRAWINGS

FIG. 11 is an exploded perspective view of the bull bar type of grill guard of FIG. 1.

FIG. 12 is a front view of the bull bar of FIGS. 1 and 11.

FIG. 13 is a side view of the bull bar of FIGS. 1, 11 and 12.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
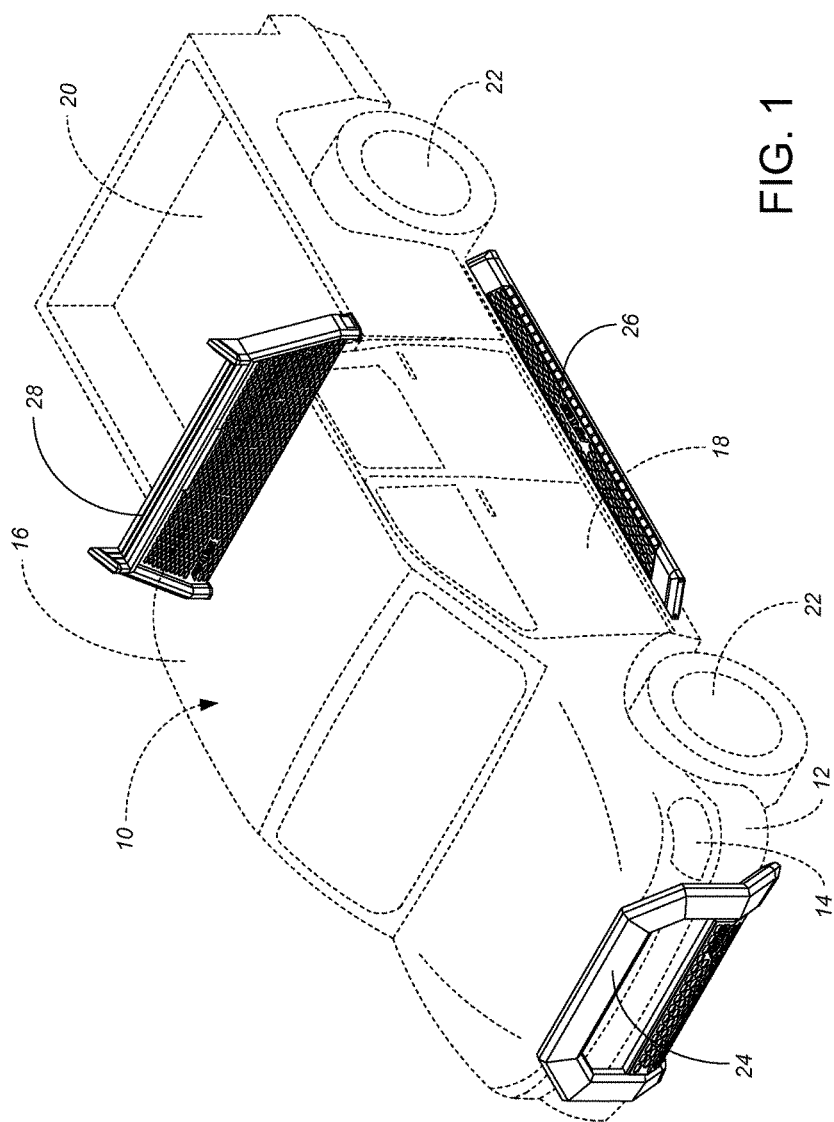
FIG. 1 is a perspective view of a pickup truck outfitted with preferred side bars, a bull bar and a headache rack all in accordance with the present invention.

As an example vehicle for showing usage of the present invention, FIG. 1 shows a pickup truck 10. Characteristic of most pickup trucks, the truck 10 shown includes a front bumper 12 and headlights 14, a cab 16 with doors 18, and a box or bed 20, all supported on a frame (not separately shown) for moving on four wheels 22. The truck 10 shown in FIG. 1 has been outfitted with three types of exterior accessories designed in accordance with the present invention, namely, a bull bar 24 type of grill guard, two side bars 26 (one on the driver's side and one (not separately shown) on the passenger's side of the truck 10), and a headache rack 28.

Figure 2:
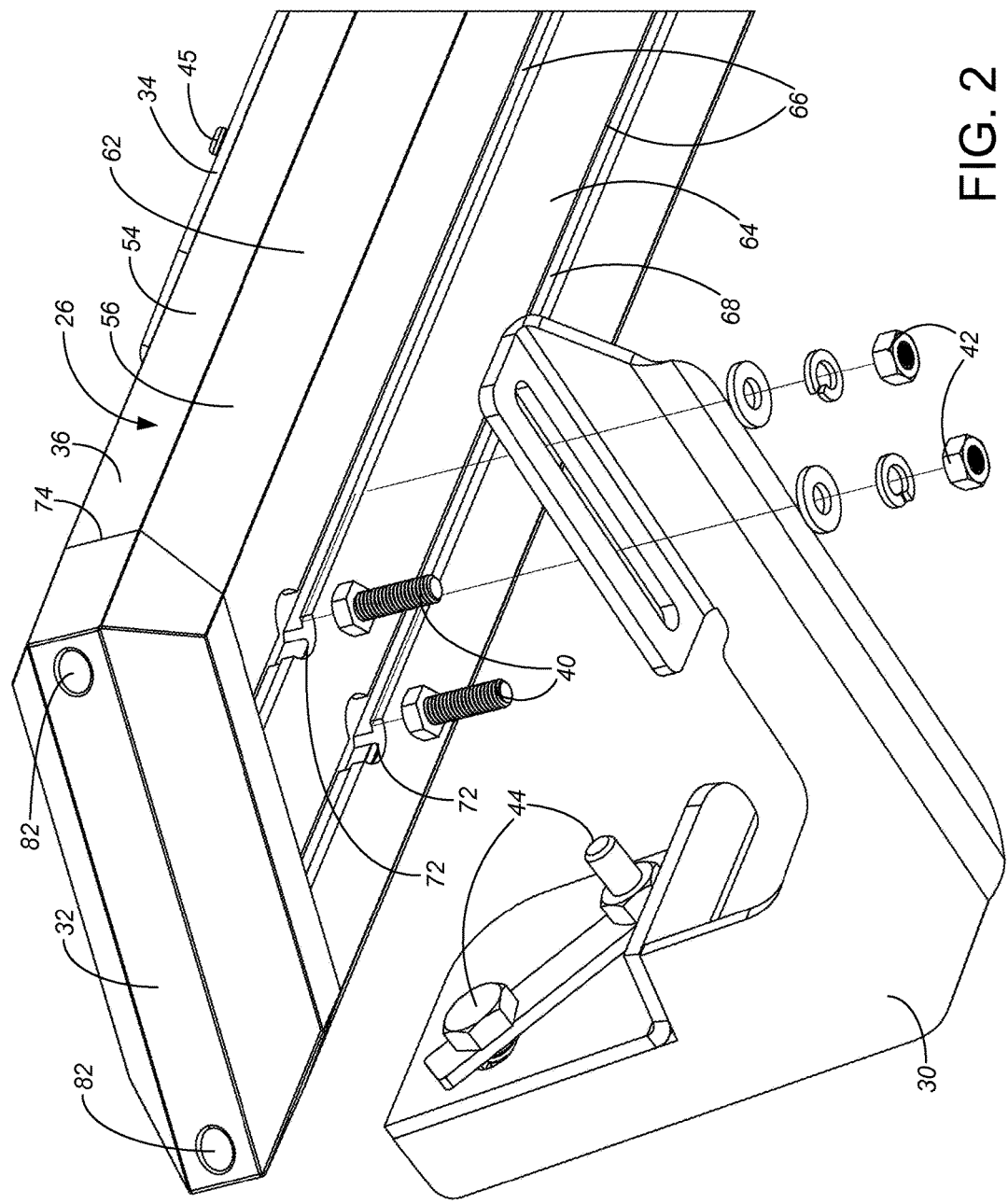
FIG. 2 is a perspective view from below showing attachment of the support bracket to the side bar of FIG. 1.
Figure 3:
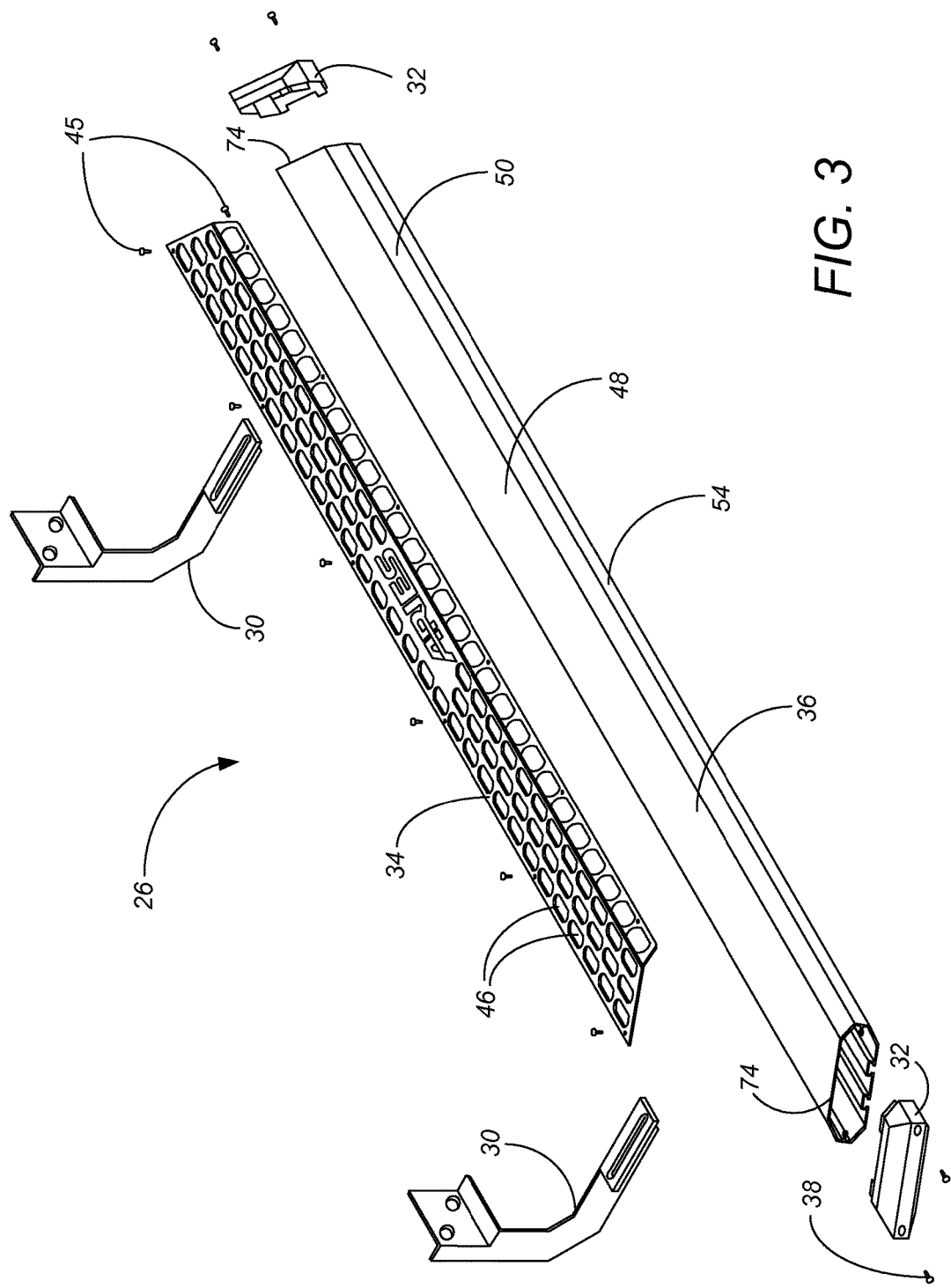
FIG. 3 is an exploded perspective view of the side bar of FIG. 1.

As better shown in the assembly view of FIG. 2 and the exploded view of FIG. 3, the components which make up each of the side bars 26 include two frame brackets 30, two end caps 32 and a tread 34, each mounted with respect to the primary running board 36. The end caps 32 are mounted to the side bar 26 using two bolts or screws 38 per end cap 32, but could in some embodiments be mounted by other means, such as clips or adhesive. Each of the frame brackets 30 are mounted to the underside of the running board 36 with bolts 40 and nuts 42 (shown in FIG. 2). Similar bolts 44 (shown in FIG. 2) are used to mount each of the frame brackets 30 to the frame (not separately shown) of the truck 10.

The tread 34 is mounted to a top surface of the running board 36 with bolts or screws 45, but could alternatively be mounted with clips, adhesive or rivets. Also sometimes called a step pad, the purpose of the tread 34 is to minimize slipping with the user's shoes or boots (which may occasionally be wet or caked in mud or other slippery substances) when the user stands on the side bar 26 or climbs in and out of the cab 16 using the side bar 26. Openings 46 in the tread 34 help to keep mud or other substances from causing slippage. The openings 46 can be in the shape of a trademark or can define other words or images. In the preferred embodiment shown, the openings 46 define both the mark ARIES and a repeating octagon shape mark similar to the overall octagonal shape of the running board 36. While the tread 34 could be molded from a polymer material, the preferred tread 34 is punched out of a 3 mm thick sheet of 5052 aluminum. The tread 34 could cover only the top face 48 of the running board 36, but more preferably is bent to cover not only the top face 48 but also one of the side faces 50 of the running board 36.

Figure 4:
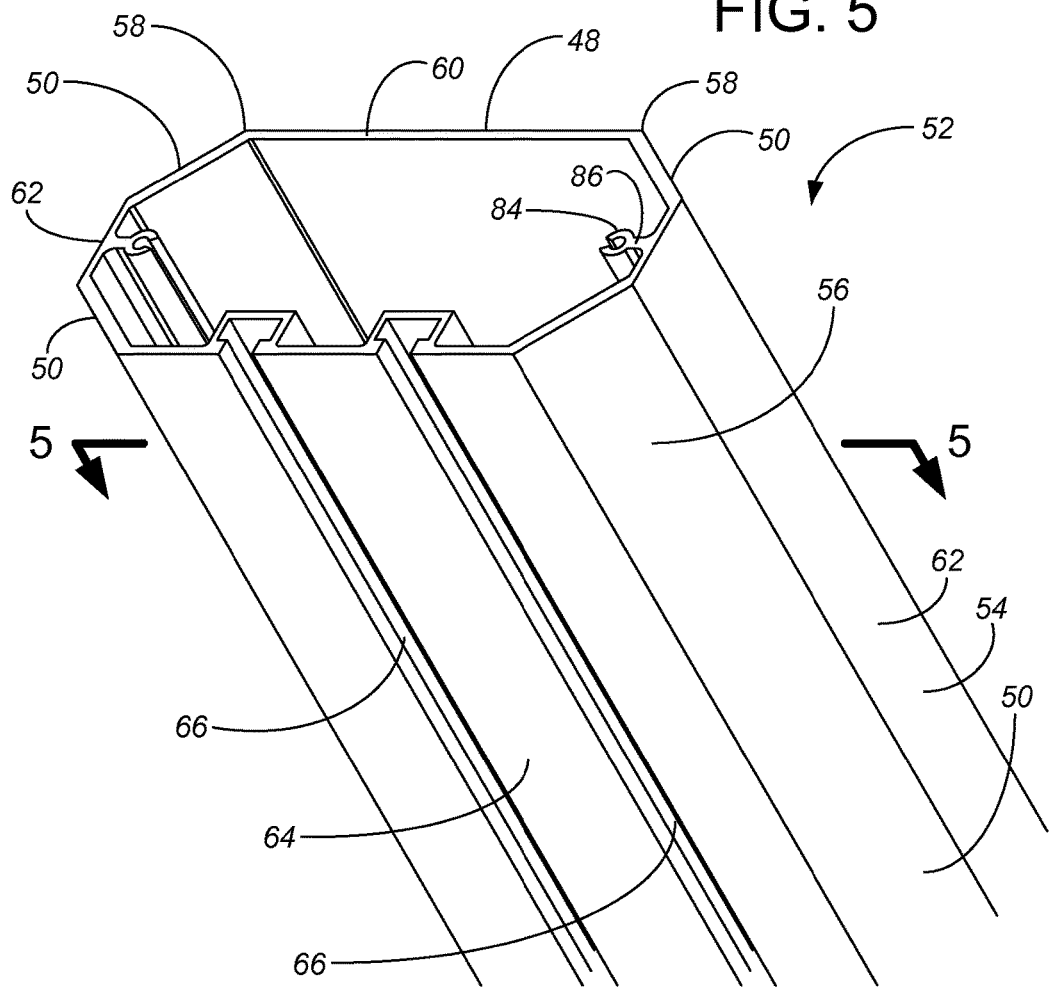
FIG. 4 is a partial perspective view, from below of the basic extrusion used in the side bar of FIG. 2.
Figure 6:
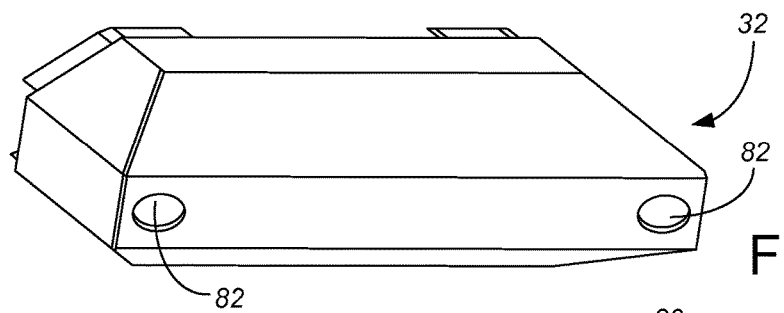
FIGS. 6 and 7 are perspective views of the end caps used in the side bar of FIG. 2.
Figure 7:
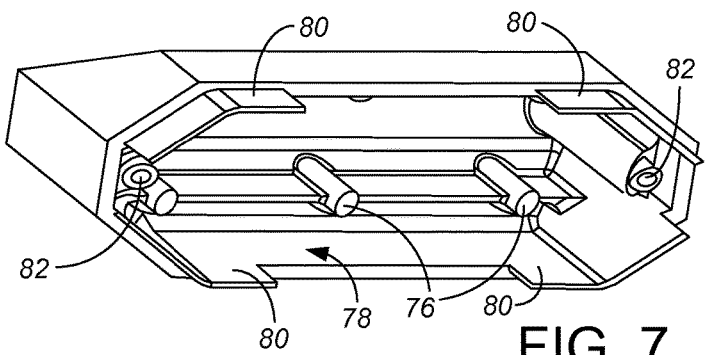
Figure 8:
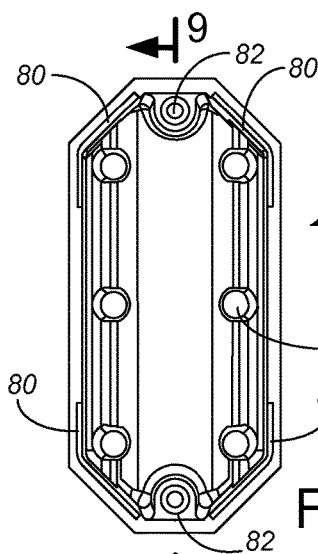
FIG. 8 is an end view of the end caps of FIGS. 3, 6 and 7.
Figure 9:
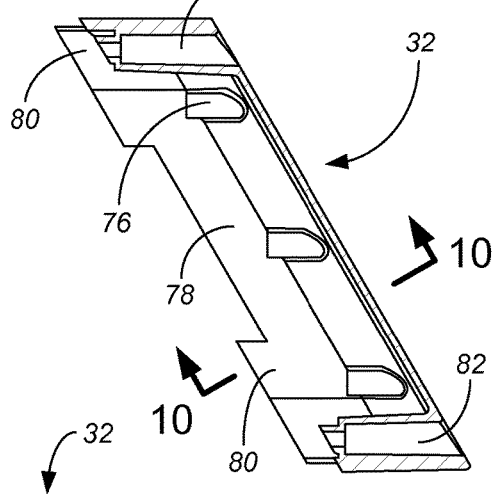
FIG. 9 is a cross-sectional view of the end cap, taken along lines 9-9 in FIG. 8.
Figure 10:
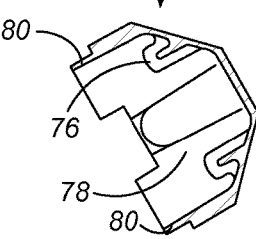
FIG. 10 is a cross-sectional view of the end cap, taken along lines 10-10 in FIG. 9.

In contrast to the tubes used for most prior art side bars, the running board 36 of the present invention is formed from an extrusion 52 best shown in FIG. 4. Instead of being round, oval or rectangular, the outside cross-sectional shape of the extrusion 52 is, in the preferred embodiment, octagonal. Of the octagonal shape, the top face 48 of the running board 36 is a major face, i.e., is wider than the size of the side walls 54, 56. For instance, the preferred octagonal embodiment includes a top surface 48 which is flat and planar, with edges 58 of the top face 48 being linear and being about 100 mm apart. The 100 mm wide planar major face 48 provides an appropriately sized flat surface to serve as a step on the vehicle 10. There are three side walls 54, 56 on one side of the top wall 60 toward the vehicle 10 and three side walls on the other side of the top wall 60 away from the vehicle 10, each presenting a planar face running longitudinally which is at 45° to adjacent faces. The side faces 50, 62 are smaller than the top face 48. For instance, the preferred embodiment includes vertical side walls 54 which are about 25 mm wide (i.e., about one quarter the size of the top face 48). The angled side walls 56 in the preferred embodiment are all equally sized, with the preferred size having the width and height profile of the running board 36 be 140×65 mm, so each of the angled side walls 56 are about 28 mm wide. Each of the side walls 54, 56 provides a generally planar exposed side surface 50, 62 running longitudinally. Many other shapes could alternatively be used instead of the preferred octagon. As one example, the running board 36 could be formed as a hexagonal extrusion. The exterior surface of any of the walls 54, 56, 60 could have an exterior profile which was curved instead of planar. However, with six side walls 54, 56 and the top wall 60 all having planar outer surfaces 50, 62, 48, the running board 36 is strong and appropriately sized and shaped to receive the user's footwear, while simultaneously presents a pleasing and unique non-rectangular angular look.

The frame brackets 30 support the running board 36 so the top surface 48 extends horizontally. When thus supported, two of the side walls 54 extend vertically, while four of the side walls 56 extend at an angle to vertical, with the preferred angle being 45°. When the user steps on the running board 36, the four angled side walls 56 absorb the majority of the weight of the user as a bending moment, while the vertical side walls 54 and the top wall 60 support the weight much more in compression. To better withstand the bending moments and resist deformation of the side bar 26 during use, the preferred extrusion 52 includes a thicker wall thickness for the four angled side walls 56 than for the vertical side walls 54 and thicker than for the top wall 60. When extruded from 6063-T5 aluminum, the preferred embodiment includes a top wall thickness of 2 mm, and vertical side wall thicknesses of 2 mm, as compared to angled side wall thicknesses of 3 mm. Alternatively, the dimensions can be changed or the side bars 26 formed of a different metal material to withstand the forces and moments which will be encountered during use. For instance, the running boards could alternatively be formed of steel, including a steel sheet material which was bent into the desired octagonal (or hexagonal, or other non-rectangular polygonal) shape.

Figure 5:
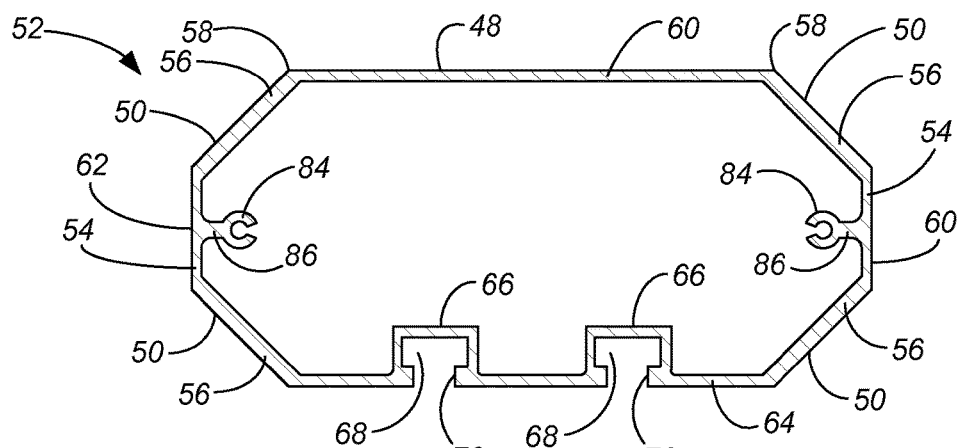
FIG. 5 is a cross-sectional view of the extrusion of FIG. 4.

As best shown in FIG. 2, the frame brackets 30 mate with an attachment wall 64 of the running board extrusion 52. The preferred attachment wall 64 includes two attachment slides 66. As best shown in FIGS. 4 and 5, each of the attachment slides 66 includes a longitudinally running recess 68 with a neck 70. In the preferred embodiment, the recess 68 is a 13.5×6.5 mm rectangular recess with a 8.5 mm wide neck 70. With rectangular attachment slides 66, standard bolts 40 can be used with nuts 42 to attach the frame brackets 30 to the attachment wall 64. As shown in FIG. 2, openings 72, which are at least the size of the heads of the bolts 40 used for attachment, are preferably machined in after the extrusion 52 is formed to provide a convenient location to attach and remove the bolts 40 from the slides 66. In the preferred embodiment, the openings 72 are circular and 20 mm in diameter, but only as deep as the face of the slide 66. Alternatively, the bolts 40 could be slid into the attachment slides 66 from the end of the running board extrusion 52 with the end caps 32 removed. In either embodiment, the bolts 40 can then be slid to any desired longitudinal position so as to match up with the positioning of the frame brackets 30 where the frame brackets 30 can be appropriately attached to the frame of the vehicle 10. The sliding of the bolts 40 in the attachment slides 66 thus permits great flexibility in being able to use the same running board 36 and frame brackets 30 with many different models of vehicles. The wall thickness forming the neck 70 is preferably thicker than the wall thickness of the rest of the attachment wall 64, to better withstand the stress of the bolt heads. In the preferred embodiment, the wall thickness at the neck 70 is 4 mm, while the wall thickness of the rest of the attachment wall 64 is 2 mm.

In manufacturing, the extrusion 52 is formed of indeterminate length, and is cut to the desired length for the side bar 26. For instance, the depicted side bar 26 has a length of 1905 mm, using a running board 36 of a length of 1826 mm. Other side bars can be offered in other lengths, with preferred side bar lengths being 1346 mm, 2159 mm and 2312 mm. By stocking these four lengths of side bars and with the flexibility of the attachment slides 66, an appropriate length of side bar can be readily attached to any of hundreds of different model vehicles.

In the preferred embodiment, the cuts which form the ends 74 of the running board 36 are at an angle to the longitudinal axis, with the preferred angle being 30°. The end caps 32 are formed to match the cut angle and cover the cut ends 74 of the running board 36. The end caps 32 are preferably formed of the same material as the running board 36, but alternatively could be formed of a different material. In the preferred embodiment, the end caps 32 are cast from aluminum. The casting includes six ejection pads 76 on a recessed interior 78 of the end caps 32.

The preferred extrusion profile is symmetrical about a vertical longitudinally extending mid-plane, and the same extrusion profile is used for both right and left running boards 36. Front and rear, left and right end caps are identical to reduce manufacturing complexity. The preferred end caps 32 include one or more sleeve portions 80 which mate on the inside of the extrusion profile to assist in aligning during assembly and to assist in holding the end caps 32 in alignment during use. Screws or bolts 38 are used to fasten the end caps 32 to the running board 36. In the preferred embodiment, the end caps 32 include recessed openings 82 for the threaded fasteners 38.

The threaded fasteners 38 for the end caps 32 seat into two fastener openings 84 on the extrusion 52. The preferred extrusion 52 includes two sets of longitudinally extending webs 86 and C-shaped fastener openings 84. The web 86 enables the fastener openings 84 to be spaced inwardly from the side walls 54, 56, with the preferred web 86 being 3 mm wide and spacing the center of the C-shaped fastener openings 84 about 10 mm inward from the outer planar face 62 of the vertical side walls 54. The C-shape 84 extends for about 315° cylindrically around the fastener opening axis. By using a C-shape 84 rather than a complete cylinder, the tool used for forming the extrusion 52 is simpler. The 315° fastener opening profile still provides enough purchase for the threaded fasteners 38 in holding on the end caps 32. By having the fastener openings 84 and webs 86 extend continuously in the longitudinal direction on the interior of the extrusion 52, the fastener openings 84 are exposed at any location that the extrusion 52 is cut, making manufacturing and assembly simple for any length of side bar and for any angle of cut 74. The preferred sleeve portions 80 on the end caps 32 extend around only a portion of the periphery of the ends caps 32 so as to avoid interference with the web 86. Other locations or numbers of fastener openings could be included in the extrusion profile using the same concepts.

As best shown in FIGS. 1 and 11-14, the extrusion 52 of the present invention is used not only in the side bars 26, but also in other exterior accessories including a bull bar 24 and a headache rack 28. When used to form the bull bar 24 and the headache rack 28, the extrusion 52 is cut at angles, and the angled cuts are welded together to create a desired angular shape. Having the extrusion profile bi-laterally symmetrical allows the cutting to occur and the cuts to be aligned for welding with little or no waste of the extrusion 52.

On the bull bar 24, the top wall 60 of the extrusion 52 is turned to generally face forward. For instance, the preferred bull bar 24 includes cuts 87, 88 of about ±22.5° (on a front view) to the longitudinal axis, which can be cut with no waste and joined (welded) in the configuration shown in FIG. 1 to form the bull bar 24. The preferred bull bar 24 also has some curvature around the bumper, such as by having cuts 88 be at about 7° (on a side view) to the longitudinal axis and by having cuts 90 be at about 15° (on a side view) to the longitudinal axis. This curvature around the bumper does introduce some waste because the total exposed surface of the top wall 60 is greater than the total exposed surface of the attachment wall 64. The preferred bull bar 24 utilizes identical 30° end caps 32 as used on the side bars 26. The preferred bull bar 24 also includes a center support flange 90, which can be formed from bent aluminum sheet material, and is preferably attached to the extrusion 52 using screws 92. A step pad 94 with openings 46 can be attached over the front faces of the center support flange 90, creating a complimentary look to the bull bar 24 as to the side bars 26.

Figure 14:
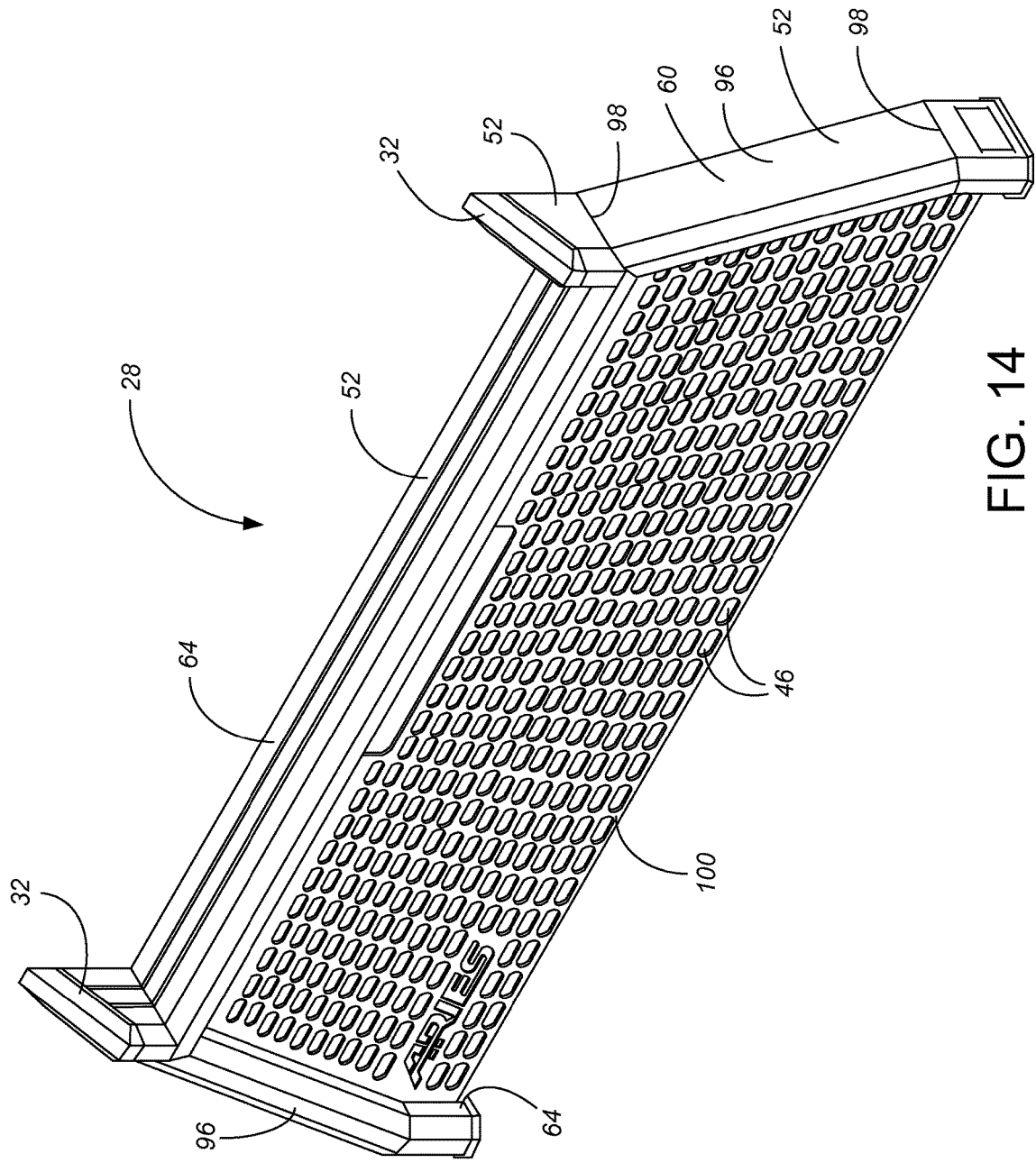
FIG. 14 is a perspective view of the headache rack of FIG. 1.

As best shown in FIG. 14, the headache rack 28 includes uprights 96 in which the top wall 60 of the extrusion 52 is turned to generally face outward. Angled cuts 98 of the extrusion 52 are again used to select the length of the various pieces of the headache rack 28, which are then welded together. Like the side view curving of the bull bar 24, the cuts 98 of the headache rack 28 introduce some waste because the total exposed surface of the top wall 60 is greater than the total exposed surface of the attachment wall 64. On the tops of the uprights 96, the preferred headache rack 28 utilizes identical 30° end caps 32 as used on the side bars 26. The bottoms of the uprights 96 mate into stake openings (not separately shown) in the box 20 of the truck 10. A grate 100 is used in the center of the headache rack 28, and openings 46 in the grate 100 can echo the shapes of openings 46 in the step pad 94 and openings 46 in the tread 34, furthering the complimentary look to the headache rack 28 as to the bull bar 24 and side bars 26. The openings 46 in the grate 100 also allow some viewing through the grate 100. The grate 100 can be welded the extrusion 52 such as to the attachment wall 64 of the uprights 96 between the recesses 68 (called out in FIG. 5), or could alternatively be attached by other means. By having bull bars 24, other types of grill guards (not shown), headache racks 28, side bars 26, etc. all formed from the same basic extrusion 52, consumers can purchase multiple different exterior accessories for their vehicle 10 with all of the exterior accessories having the same look and feel.

The present invention thus provides a hollow tubular shape which can be used as a basic extrusion 52 in creating any of several different exterior accessories for a vehicle 10. The outside of the hollow tubular shape provides flat surfaces and angled edges over most of its periphery (i.e., except for the attachment wall 64). The attachment wall 64 provides attachment slides 66 that enable the extrusion 52 to be attached in numerous configurations, including to attachment brackets for use as configured for that particular exterior accessory. The interior of the hollow tubular shape is particularly configured to receive end caps 32, which can also be used in multiple different types of exterior accessories.

Although the present invention has been described with reference to preferred embodiments, workers skilled in the art will recognize that changes may be made in form and detail without departing from the spirit and scope of the invention.

The invention claimed is:

1. A vehicle exterior accessory formed primarily from a hollow tubular member, the hollow tubular member comprising:
   a major wall having a generally planar exposed major surface running longitudinally between two longitudinally extending edges;
   at least four side walls connected to the longitudinally extending edges, each of the side walls having a generally planar exposed side surface running longitudinally; and
   an attachment wall connected with the major wall and the side walls to complete a hollow tubular profile, the attachment wall defining an exposed connection slide opening running longitudinally, the connection slide opening defining a neck for holding a connection;

wherein the hollow tubular member is formed of aluminum extruded about a longitudinal axis within the hollow tubular profile, and wherein the extruded hollow tubular member has ends formed by transversely cutting the hollow tubular member at a non-perpendicular angle relative to the longitudinal axis.

2. The vehicle exterior accessory of claim 1, comprising multiple pieces of hollow tubular members welded together at the location of the non-perpendicular cut on each of the multiple pieces, with their major walls extending contiguously.

3. The vehicle exterior accessory of claim 2 in the form of a grill guard attachable on a front of a vehicle.

4. The vehicle exterior accessory of claim 2 in the form of a headache rack attachable behind a cab of a vehicle.

5. The vehicle exterior accessory of claim 1, wherein the hollow tubular member comprises at least six side walls, wherein the major wall, the at least six side walls and the attachment wall are arranged in an octagon with the longitudinally extending edges defining 45° angles between the major wall and the two adjacent side walls.

6. The vehicle exterior accessory of claim 1, wherein the attachment walls defines a second exposed connection slide opening running longitudinally, the second connection slide opening defining a neck for holding a connection.

7. The vehicle exterior accessory of claim 1, wherein the hollow tubular member comprises a plurality of longitudinally extending fastener openings on an inside of the hollow tubular profile.

8. The vehicle exterior accessory of claim 7, further comprising end caps covering the non-perpendicular cut ends of the hollow tubular member using fasteners extending through the end caps and into the fastener openings.

9. The vehicle exterior accessory of claim 7, wherein the fastener openings have a generally C-shaped cross-section.

10. A vehicle exterior accessory formed primarily from a hollow tubular member, the hollow tubular member comprising:
a major wall having a generally planar exposed major surface running longitudinally between two longitudinally extending edges, the major wall having a major wall thickness defined between an inside surface and the longitudinally running exposed major surface;
at least four side walls connected to the longitudinally extending edges, each of the side walls having a generally planar exposed side surface running longitudinally; and
an attachment wall connected with the major wall and the side walls to complete a hollow tubular profile, the attachment wall defining an exposed connection slide opening running longitudinally, the connection slide opening defining a neck for holding a connection;
wherein at least one of the side walls is directly connected to one of the two longitudinally extending edges of the major wall and extends in a non-perpendicular fashion relative to the major wall, wherein said at least one of the side walls has a side wall thickness defined between an inside surface and the longitudinally running exposed side surface, and wherein the side wall thickness is thicker than the major wall thickness, with the side wall being able to support a weight placed on the major surface of the major wall as a bending moment, such that the thicker side wall thickness better supports the bending moment.

11. The vehicle exterior accessory of claim 10, wherein the hollow tubular member is formed of extruded aluminum.

12. The vehicle exterior accessory of claim 11, wherein the hollow tubular member is angle cut.

13. The vehicle exterior accessory of claim 10 in the form of a running board, side step or nerf bar attachable horizontally under the door on a side of a vehicle.

14. A vehicle exterior accessory formed primarily from a hollow tubular member, the hollow tubular member comprising:
a major wall having a generally planar exposed major surface running longitudinally between two longitudinally extending edges;
at least four side walls connected to the longitudinally extending edges, each of the side walls having a generally planar exposed side surface running longitudinally; and
an attachment wall connected with the major wall and the side walls to complete a hollow tubular profile, the attachment wall defining an exposed connection slide opening running longitudinally, the connection slide opening defining a neck for holding a connection;
wherein the hollow tubular member comprises a plurality of longitudinally extending fastener openings on an inside of the hollow tubular profile, wherein the fastener openings have a generally C-shaped cross-section, and wherein the fastener openings are each connected to side walls with a single longitudinally extending web portion, thereby spacing the fastener openings inwardly from the side walls.

15. A method of forming a vehicle exterior accessory, comprising:
extruding metal into a generally hollow extrusion, the generally hollow extrusion comprising:
a major wall having a generally planar exposed major surface running longitudinally between two longitudinally extending edges; and
side walls connected to the longitudinally extending edges, each of the side walls having a generally planar exposed side surface running longitudinally, the major wall and the side walls jointly defining a generally hollow profile about a longitudinal axis;
cutting the generally hollow extrusion across its longitudinal axis, wherein the cut defines an open end of longitudinally extending fastener openings on an inside of the generally hollow profile, wherein the cutting is a planar cut at a non-perpendicular angle to the longitudinal axis; and
fastening an end piece to the generally hollow extrusion using the open end of the longitudinally extending fastener openings.

16. The method of claim 15, wherein the metal for extruding the generally hollow extrusion is aluminum.

17. The method of claim 15, wherein the end piece is an end cap, and further comprising:
casting the end cap into a shape having an interior sleeve portion sized to fit in mating engagement within the generally hollow extrusion;
positioning the end cap covering the cut of the generally hollow extrusion with the interior sleeve portion extending partially within the generally hollow extrusion; and
fastening the end cap to the generally hollow extrusion with fasteners extending through the end cap and into the open end of the longitudinally extending fastener openings.

18. The method of claim 17, wherein the fastener openings have a generally C-shaped cross-section, and wherein the fastener openings are each connected to side walls with a single longitudinally extending web portion, thereby spacing the fastener openings inwardly from the side walls.

19. A method of forming a vehicle exterior accessory, comprising:
   extruding metal into a generally hollow extrusion, the generally hollow extrusion comprising:
      a major wall having a generally planar exposed major surface running longitudinally between two longitudinally extending edges; and
      side walls connected to the longitudinally extending edges, each of the side walls having a generally planar exposed side surface running longitudinally, the major wall and the side walls jointly defining a generally hollow profile about a longitudinal axis;
   cutting the generally hollow extrusion across its longitudinal axis, wherein the cut defines an open end of longitudinally extending fastener openings on an inside of the generally hollow profile; and
   fastening an end piece to the generally hollow extrusion using the open end of the longitudinally extending fastener openings;
wherein the extruding creates a generally hollow extrusion wherein at least one of the side walls is directly connected to one of the two longitudinally extending edges of the major wall and extends in a non-perpendicular fashion relative to the major wall, wherein said at least one of the side walls has a side wall thickness defined between an inside surface and the longitudinally running exposed side surface, and wherein the side wall thickness is thicker than the major wall thickness, with the side wall being able to support a weight placed on the major surface of the major wall as a bending moment, such that the thicker side wall thickness better supports the bending moment.

20. The method of claim 19, wherein the cutting is a planar cut at a non-perpendicular angle to the longitudinal axis.

21. The method of claim 20, further comprising welding multiple pieces of angle cut generally hollow extrusions together at their planar cuts with their major walls extending contiguously.

22. A vehicle having at least two exterior accessories mounted thereon, wherein at least one of the exterior accessories is selected from the group consisting of grill guards and headache racks, and wherein each of the at least two exterior accessories is formed primarily from a hollow tubular member, the hollow tubular member having an identical cross-sectional profile in both of the at least two exterior accessories, the hollow tubular member comprising:
   a major wall having a generally planar exposed major surface running longitudinally between two longitudinally extending edges; and
   side walls connected at a non-perpendicular angle relative to the major wall and extending from the longitudinally extending edges, each of the side walls having a generally planar exposed side surface running longitudinally.

* * * * *